US010743296B2

(12) United States Patent
Huang et al.

(10) Patent No.: US 10,743,296 B2
(45) Date of Patent: Aug. 11, 2020

(54) FOR AN UPLINK CONTROL CHANNEL

(71) Applicant: QUALCOMM Incorporated, San Diego, CA (US)

(72) Inventors: Yi Huang, San Diego, CA (US); Renqiu Wang, San Diego, CA (US); Hao Xu, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/792,375

(22) Filed: Oct. 24, 2017

(65) Prior Publication Data

US 2018/0115972 A1   Apr. 26, 2018

Related U.S. Application Data

(60) Provisional application No. 62/412,691, filed on Oct. 25, 2016.

(51) Int. Cl.
*H04W 72/04* (2009.01)
*H04L 5/00* (2006.01)

(52) U.S. Cl.
CPC ....... *H04W 72/0413* (2013.01); *H04L 5/0048* (2013.01); *H04L 5/0053* (2013.01); *H04W 72/042* (2013.01); *H04L 5/0012* (2013.01)

(58) Field of Classification Search
CPC ............ H04W 72/0413; H04W 72/042; H04L 5/0048; H04L 5/0053; H04L 5/0012
USPC .......................................................... 370/329
See application file for complete search history.

(56) References Cited

U.S. PATENT DOCUMENTS

| | | | |
|---|---|---|---|
| 8,750,143 B2 | 6/2014 | Yin | |
| 9,154,211 B2* | 10/2015 | Sampath | H04B 7/0417 |
| 9,474,055 B2 | 10/2016 | Bertrand et al. | |
| 2009/0274109 A1* | 11/2009 | Zhang | H04L 1/1614 |
| | | | 370/329 |

(Continued)

FOREIGN PATENT DOCUMENTS

| | | |
|---|---|---|
| WO | WO-2013025158 A1 | 2/2013 |
| WO | WO-2015022137 A1 | 2/2015 |

OTHER PUBLICATIONS

3GPP TS 36.211 V13.1.0, 3rd Generation Partnership Project (Mar. 2016); Technical Specification Group Radio Access Network; Evolved Universal Terrestrial Radio Access (E-UTRA); Physical channels and modulation (Release 13) (Year: 2016).*

(Continued)

*Primary Examiner* — Mong-Thuy T Tran
(74) *Attorney, Agent, or Firm* — Patterson + Sheridan, LLP QUALCOMM Incorporated

(57) ABSTRACT

A new design for an uplink control channel is provided. A User Equipment (UE) determines, based on a tone mapping pattern from a plurality of tone mapping patterns for an uplink control channel, resources for transmitting the uplink control channel, and transmits the uplink control channel using the determined resources. A Base Station (BS) determines a tone mapping pattern from a plurality of tone mapping patterns for an uplink control channel, and transmits information regarding the determined tone mapping pattern to at least one UE. The BS receives the uplink control channel based on the tone mapping pattern.

28 Claims, 16 Drawing Sheets

(56) References Cited

U.S. PATENT DOCUMENTS

| | | | |
|---|---|---|---|
| 2010/0074130 A1* | 3/2010 | Bertrand | H04L 1/0007 370/252 |
| 2010/0238873 A1 | 9/2010 | Asanuma | |
| 2011/0085513 A1* | 4/2011 | Chen | H04W 72/042 370/330 |
| 2011/0096745 A1* | 4/2011 | Ahn | H04L 5/0016 370/329 |
| 2011/0149890 A1* | 6/2011 | Chun | H04L 5/0007 370/329 |
| 2011/0194551 A1* | 8/2011 | Lee | H04B 7/0626 370/342 |
| 2011/0216713 A1* | 9/2011 | Kim | H04L 5/0053 370/329 |
| 2011/0243066 A1* | 10/2011 | Nayeb Nazar | H04L 1/007 370/328 |
| 2012/0236771 A1* | 9/2012 | Luo | H04L 1/1607 370/311 |
| 2013/0100911 A1* | 4/2013 | Lv | H04L 1/0026 370/329 |
| 2013/0163536 A1* | 6/2013 | Anderson | H04W 72/1284 370/329 |
| 2013/0163537 A1* | 6/2013 | Anderson | H04W 72/1284 370/329 |
| 2014/0307675 A1* | 10/2014 | Xu | H04L 5/0007 370/329 |
| 2015/0373674 A1* | 12/2015 | Han | H04L 5/001 370/329 |
| 2016/0100398 A1* | 4/2016 | Xia | H04W 72/0413 370/330 |
| 2016/0337089 A1* | 11/2016 | Chen | H04L 1/1854 |
| 2017/0041948 A1 | 2/2017 | Cheng et al. | |
| 2017/0118745 A1 | 4/2017 | Nogami et al. | |
| 2017/0288848 A1 | 10/2017 | Lei et al. | |
| 2018/0110041 A1* | 4/2018 | Bendlin | H04L 5/0007 |
| 2019/0007174 A1* | 1/2019 | Takeda | H04B 1/713 |

OTHER PUBLICATIONS

International Search Report and Written Opinion—PCT/US2017/058305—ISA/EPO—dated Feb. 2, 2018.

\* cited by examiner

FOR AN UPLINK CONTROL CHANNEL

This application claims priority to U.S. Provisional Application Ser. No. 62/412,691, entitled "NEW DESIGN FOR AN UPLINK CONTROL CHANNEL", filed on Oct. 25, 2016, which is expressly incorporated by reference in its entirety.

FIELD

Aspects of the present disclosure relate to wireless communications systems and, more particularly, to a new design for an uplink control channel.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of Node Bs that can support communication for a number of user equipments (UEs). A UE may communicate with a Node B via the downlink and uplink. The downlink (or forward link) refers to the communication link from the Node B to the UE, and the uplink (or reverse link) refers to the communication link from the UE to the Node B.

These multiple access technologies have been adopted in various telecommunication standards to provide a common protocol that enables different wireless devices to communicate on a municipal, national, regional, and even global level. An example of an emerging telecommunication standard is new radio (NR, e.g., 5G radio access (RA)). NR is a set of enhancements to the LTE mobile standard promulgated by Third Generation Partnership Project (3GPP). It is designed to better support mobile broadband Internet access by improving spectral efficiency, lower costs, improve services, make use of new spectrum, and better integrate with other open standards using OFDMA with a cyclic prefix (CP) on the downlink (DL) and on the uplink (UL) as well as support beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communication by a User Equipment (UE). The method generally includes determining, based on a tone mapping pattern from a plurality of tone mapping patterns for an uplink control channel, resources for transmitting the uplink control channel, and transmitting the uplink control channel using the determined resources.

Certain aspects of the present disclosure provide a method for wireless communication by a base station (BS). The method generally includes determining a tone mapping pattern from a plurality of tone mapping patterns for an uplink control channel, transmitting information regarding the determined tone mapping pattern to at least one UE, and receiving the uplink control channel based on the tone mapping pattern.

Certain aspects of the present disclosure provide an apparatus for wireless communication by a User Equipment (UE). The apparatus generally includes means for determining, based on a tone mapping pattern from a plurality of tone mapping patterns for an uplink control channel, resources for transmitting the uplink control channel, and means for transmitting the uplink control channel using the determined resources Certain aspects of the present disclosure provide an apparatus for wireless communication by a base station (BS). The apparatus generally includes means for determining a tone mapping pattern from a plurality of tone mapping patterns for an uplink control channel, means for transmitting information regarding the determined tone mapping pattern to at least one UE, and means for receiving the uplink control channel based on the tone mapping pattern.

Aspects of the present disclosure provide apparatus, methods, processing systems, and computer readable mediums for spectrum sharing among operators.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

Figure 1:
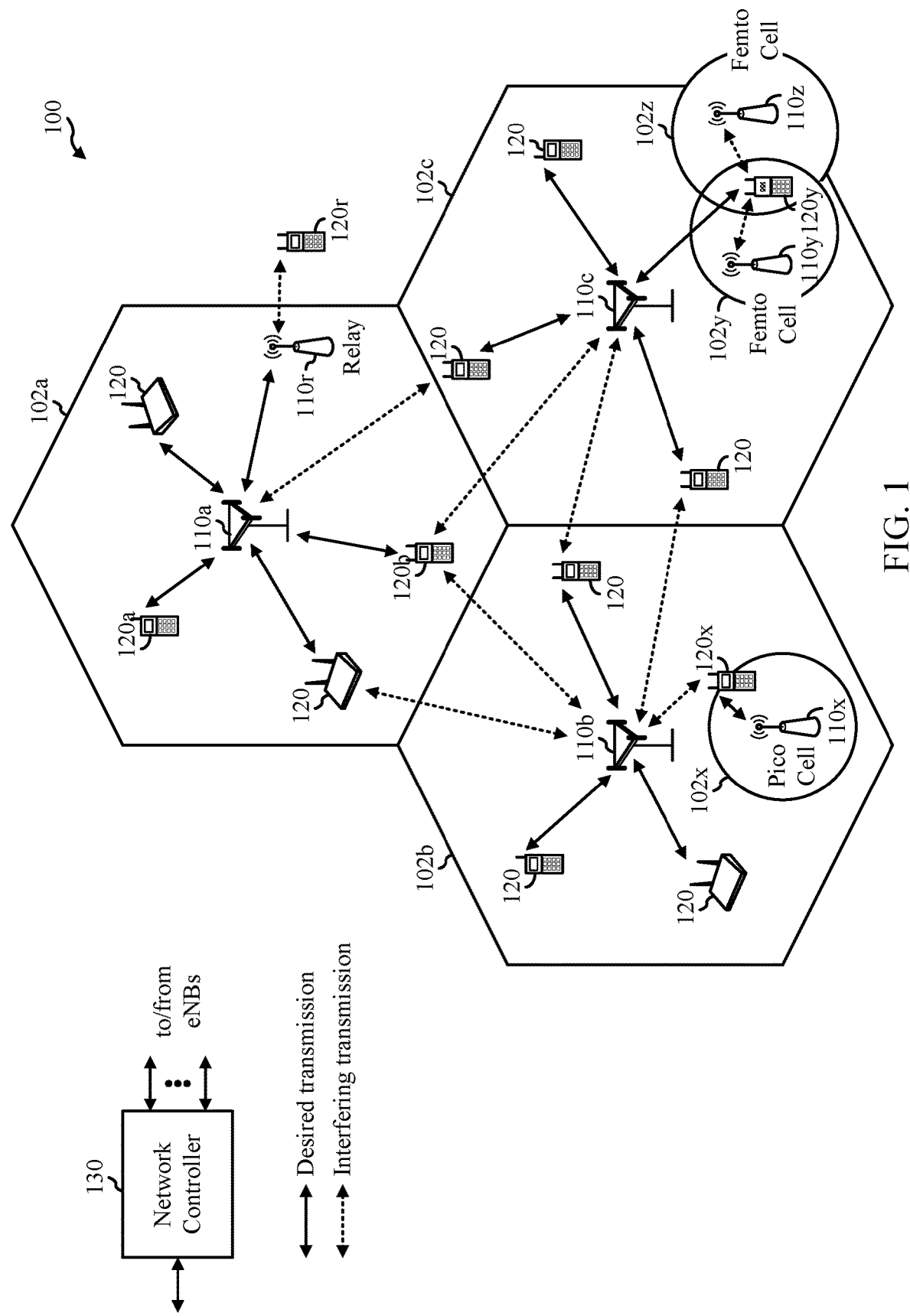
FIG. 1 is a block diagram conceptually illustrating an example telecommunications system, according to aspects of the present disclosure.

DETAILED DESCRIPTION 5G wireless standard allows usage of a new uplink frame/subframe structure. This new uplink frame/subframe structure may allow single symbol PUCCH as well as multiple symbol PUCCH. Thus, there is a need for new PUCCH design to accommodate single symbol and multiple symbol PUCCH for use in 5G systems.

Aspects of the present disclosure discuss several new patterns for transmitting PUCCH on the uplink in one or more symbols of a frame/subframe. While certain aspects of the present disclosure may be discussed with respect to one or more symbols, they are equally applicable to portions of symbols (e.g., split-symbols).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

For clarity, while aspects may be described herein using terminology commonly associated with 3G and/or 4G wireless technologies, aspects of the present disclosure can be applied in other generation-based communication systems, such as 5G and later, including NR technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced mobile broadband (eMBB) targeting wide bandwidth (e.g., 80 MHz beyond), millimeter wave (mmW) targeting high carrier frequency (e.g., 60 GHz), massive MTC (mMTC) targeting non-backward compatible MTC techniques, and mission critical targeting ultra reliable low latency communications (URLLC). For these general topics, different techniques are considered, such as coding, low-density parity check (LDPC), and polar codes. NR cell may refer to a cell operating according to the new air interface or fixed transport layer. A NR Node B (e.g., 5G Node B) may correspond to one or multiple transmission reception points (TRPs).

NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some cases DCells may transmit SS. TRPs may transmit downlink signals to UEs indicating the cell type. Based on the cell type indication, the UE may communicate with the TRP. For example, the UE may determine TRPs to consider for cell selection, access, handover, and/or measurement based on the indicated cell type.

In some cases, the UE can receive measurement configuration from the RAN. The measurement configuration information may indicate ACells or DCells for the UE to measure. The UE may monitor/detect measurement reference signals from the cells based on measurement configuration information. In some cases, the UE may blindly detect MRS. In some cases the UE may detect MRS based on MRS-IDs indicated from the RAN. The UE may report the measurement results.

Example Wireless Communications System

FIG. 1 illustrates an example wireless network 100 in which aspects of the present disclosure may be performed. For example, the wireless network may be new radio (NR) or 5G network. In an aspect, a UE 120 determines, based on a tone mapping pattern from a plurality of tone mapping patterns for an uplink control channel, resources for transmitting the uplink control channel. The UE 120 transmits the uplink control channel using the determined resources.

In an aspect, a Node B 110 determines a tone mapping pattern from a plurality of tone mapping patterns for an uplink control channel and transmits information regarding the determined tone mapping pattern to at least one UE. The Node B 110 receives the uplink control channel based on the tone mapping pattern.

Figure 5:
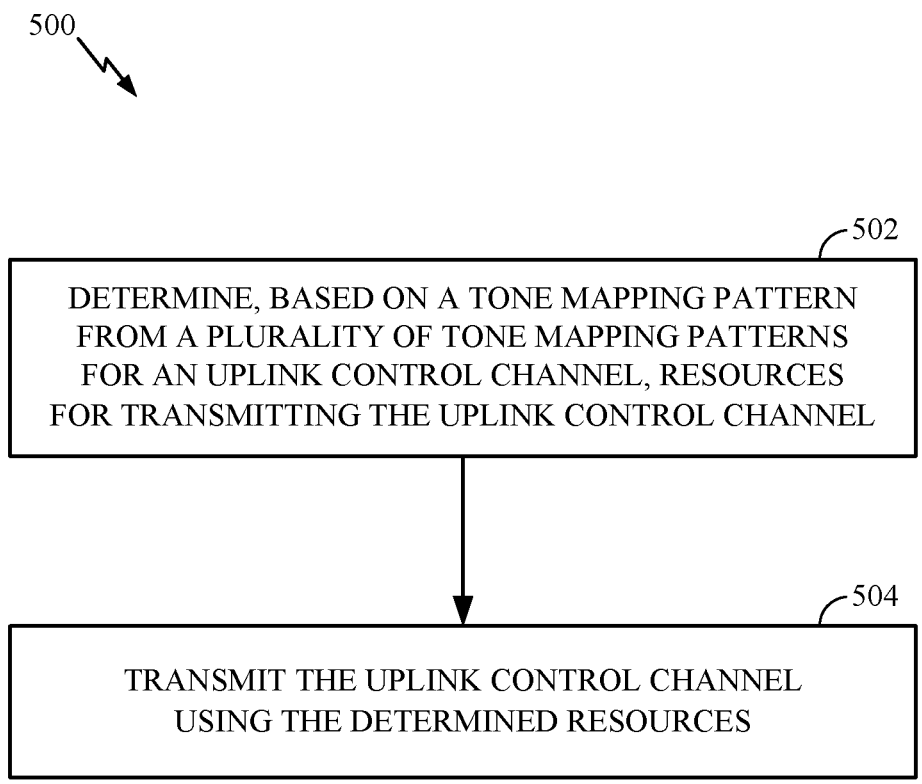
FIG. 5 illustrates example operations performed by a UE for transmitting PUCCH, in certain aspects of the present disclosure.

Each of the UEs 120 may be configured to perform the operations 500 of FIG. 5. Each of the Node Bs 110 may be configured to perform the operations 600 of FIG. 6. Furthermore, the Node Bs 110 and the UEs 120 may be configured to perform other aspects described for spectrum sharing among operators.

The system illustrated in FIG. 1 may be, for example, a long term evolution (LTE) network. The wireless network 100 may include a number of Node Bs (e.g., eNodeBs, eNBs, 5G Node B, etc) 110 and other network entities. A Node B may be a station that communicates with the UEs and may also be referred to as a base station, an access point, or a 5G Node B.

Each Node B 110 may provide communication coverage for a particular geographic area. In 3GPP, the term "cell" can refer to a coverage area of an Node B and/or an Node B subsystem serving this coverage area, depending on the context in which the term is used.

A Node B may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A Node B for a macro cell may be referred to as a macro Node B. A Node B for a pico cell may be referred to as a pico Node B. A Node B for a femto cell may be referred to as a femto Node B or a home Node B. In the example shown in FIG. 1, the Node Bs 110a, 110b and 110c may be macro Node Bs for the macro cells 102a, 102b and 102c, respectively. The Node B 110x may be a pico Node B for a pico cell 102x. The Node Bs 110y and 110z may be femto Node Bs for the femto cells 102y and 102z, respectively. A Node B may support one or multiple (e.g., three) cells.

The wireless network 100 may also include relay stations. A relay station is a station that receives a transmission of data and/or other information from an upstream station (e.g., a Node B or a UE) and sends a transmission of the data and/or other information to a downstream station (e.g., a UE or a Node B). A relay station may also be a UE that relays transmissions for other UEs. In the example shown in FIG. 1, a relay station 110r may communicate with the Node B 110a and a UE 120r in order to facilitate communication between the Node B 110a and the UE 120r. A relay station may also be referred to as a relay Node B, a relay, etc.

The wireless network 100 may be a heterogeneous network that includes Node Bs of different types, e.g., macro Node Bs, pico Node Bs, femto Node Bs, relays, transmission reception points (TRPs), etc. These different types of Node Bs may have different transmit power levels, different coverage areas, and different impact on interference in the wireless network 100. For example, macro Node Bs may have a high transmit power level (e.g., 20 Watts) whereas pico Node Bs, femto Node Bs and relays may have a lower transmit power level (e.g., 1 Watt).

The wireless network 100 may support synchronous or asynchronous operation. For synchronous operation, the Node Bs may have similar frame timing, and transmissions from different Node Bs may be approximately aligned in time. For asynchronous operation, the Node Bs may have different frame timing, and transmissions from different Node Bs may not be aligned in time. The techniques described herein may be used for both synchronous and asynchronous operation.

A network controller 130 may couple to a set of Node Bs and provide coordination and control for these Node Bs. The network controller 130 may communicate with the Node Bs 110 via a backhaul. The Node Bs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro Node Bs, pico Node Bs, femto Node Bs, relays, etc. In FIG. 1, a solid line with double arrows indicates desired transmissions between a UE and a serving Node B, which is a Node B designated to serve the UE on the downlink and/or uplink. A dashed line with double arrows indicates interfering transmissions between a UE and a Node B.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively. New radio (NR) may use a different air interface, other than OFDM-based. NR networks may include entities such central units or distributed units.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units or distributed units.

Figure 2:
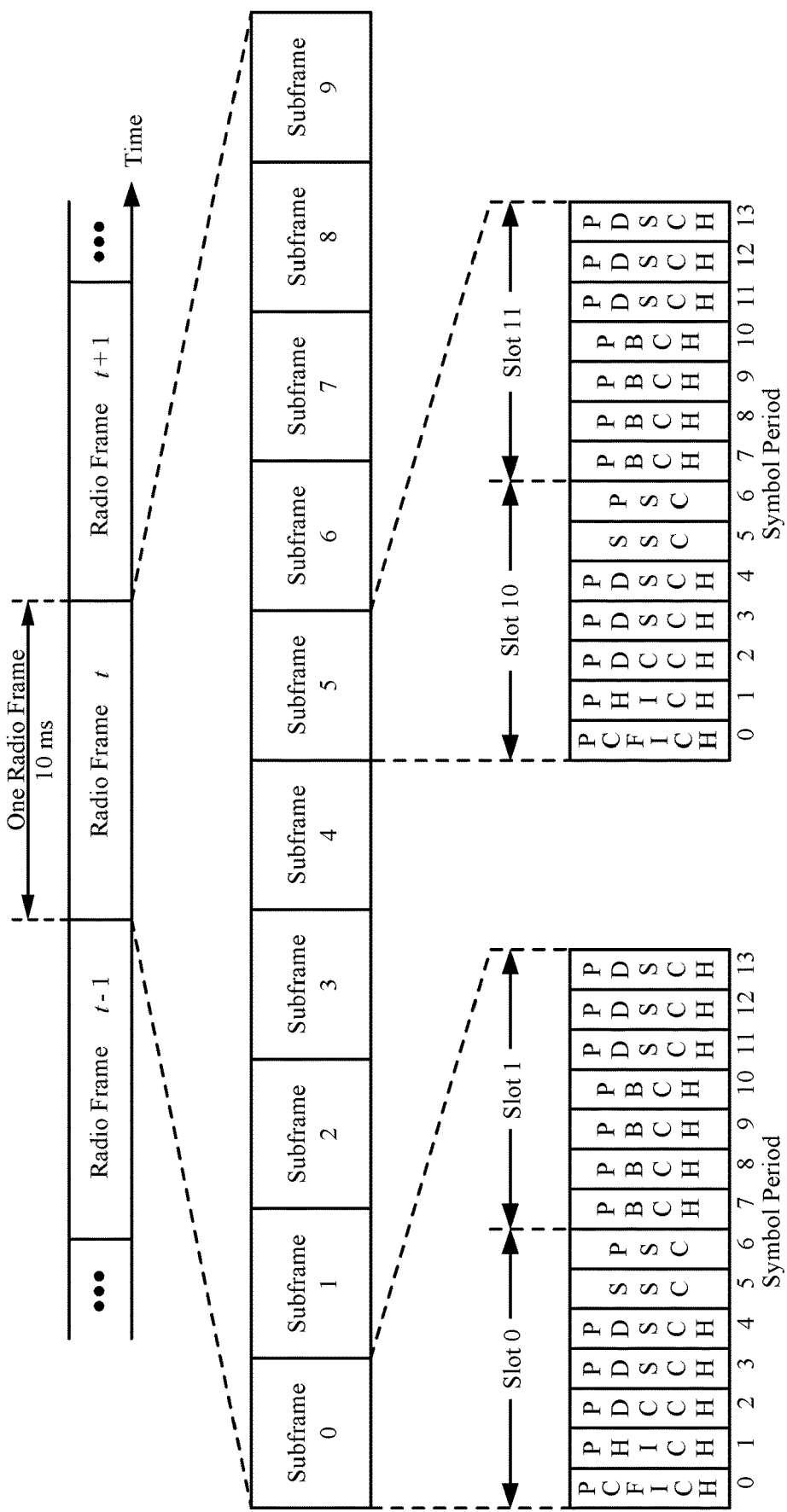
FIG. 2 is a block diagram conceptually illustrating an example downlink frame structure in a telecommunications system, according to aspects of the present disclosure.

FIG. 2 shows a down link (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each sub-frame may be assigned indices of 0 through 2L−1. The available time frequency resources may be partitioned into resource blocks. Each resource block may cover N subcarriers (e.g., 12 subcarriers) in one slot.

In LTE, a Node B may send a primary synchronization signal (PSS) and a secondary synchronization signal (SSS) for each cell in the Node B. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The Node B may send a Physical Broadcast Channel (PBCH) in symbol periods 0 to 3 in slot 1 of sub-frame 0. The PBCH may carry certain system information.

The Node B may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The Node B may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The Node B may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The Node B may send the PSS, SSS and PBCH in the center 1.08 MHz of the system bandwidth used by the Node B. The Node B may send the PCFICH and PHICH across the entire system bandwidth in each symbol period in which these channels are sent. The Node B may send the PDCCH to groups of UEs in certain portions of the system bandwidth. The Node B may send the PDSCH to specific UEs in specific portions of the system bandwidth. The Node B may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A Node B may send the PDCCH to the UE in any of the combinations that the UE will search.

A UE may be within the coverage of multiple Node Bs. One of these Node Bs may be selected to serve the UE. The serving Node B may be selected based on various criteria such as received power, path loss, signal-to-noise ratio (SNR), etc.

Figure 3:
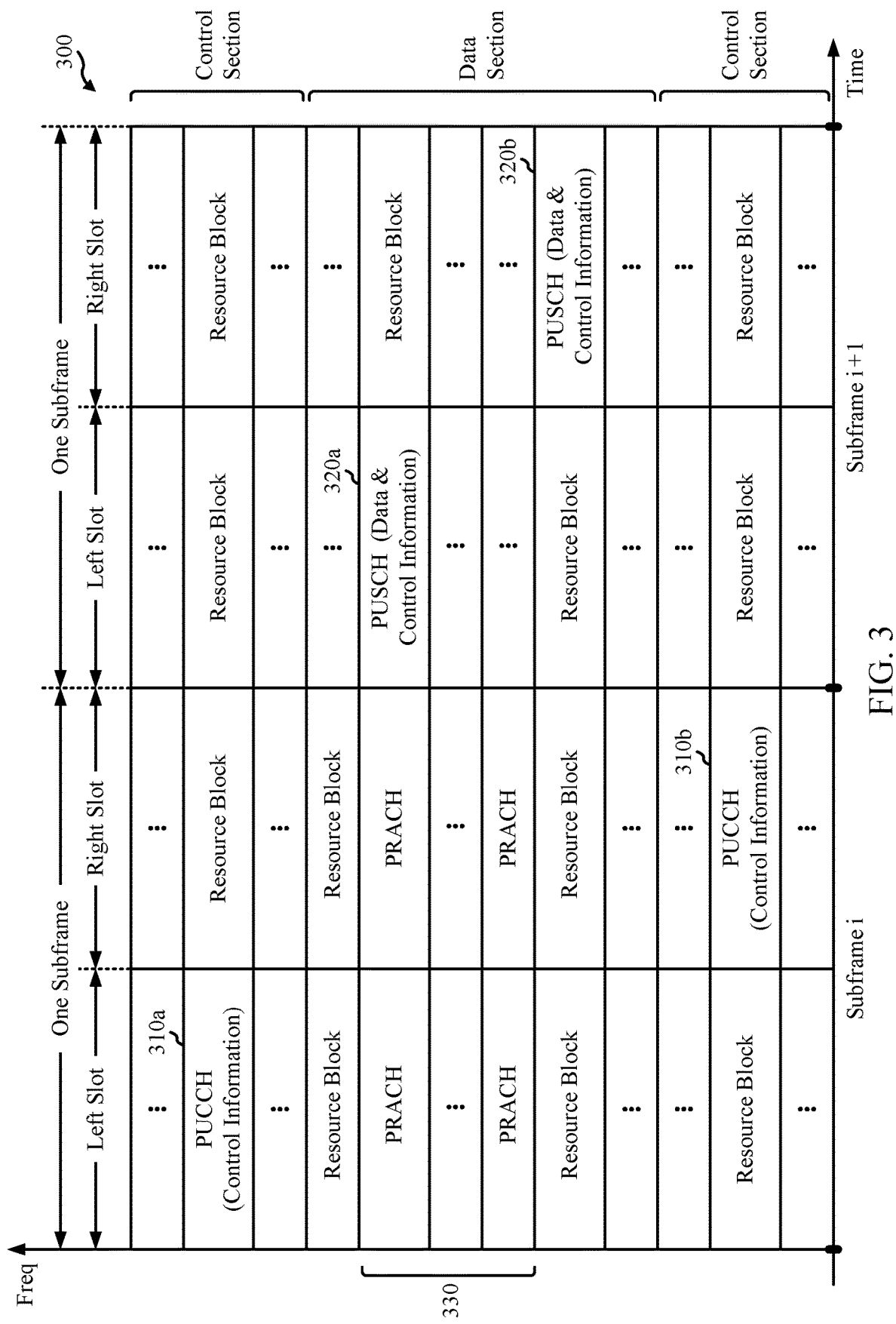
FIG. 3 is a diagram illustrating an example uplink frame structure in a telecommunications system, according to aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310a, 310b in the control section to transmit control information to a Node B. The UE may also be assigned resource blocks 320a, 320b in the data section to transmit data to the Node B. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
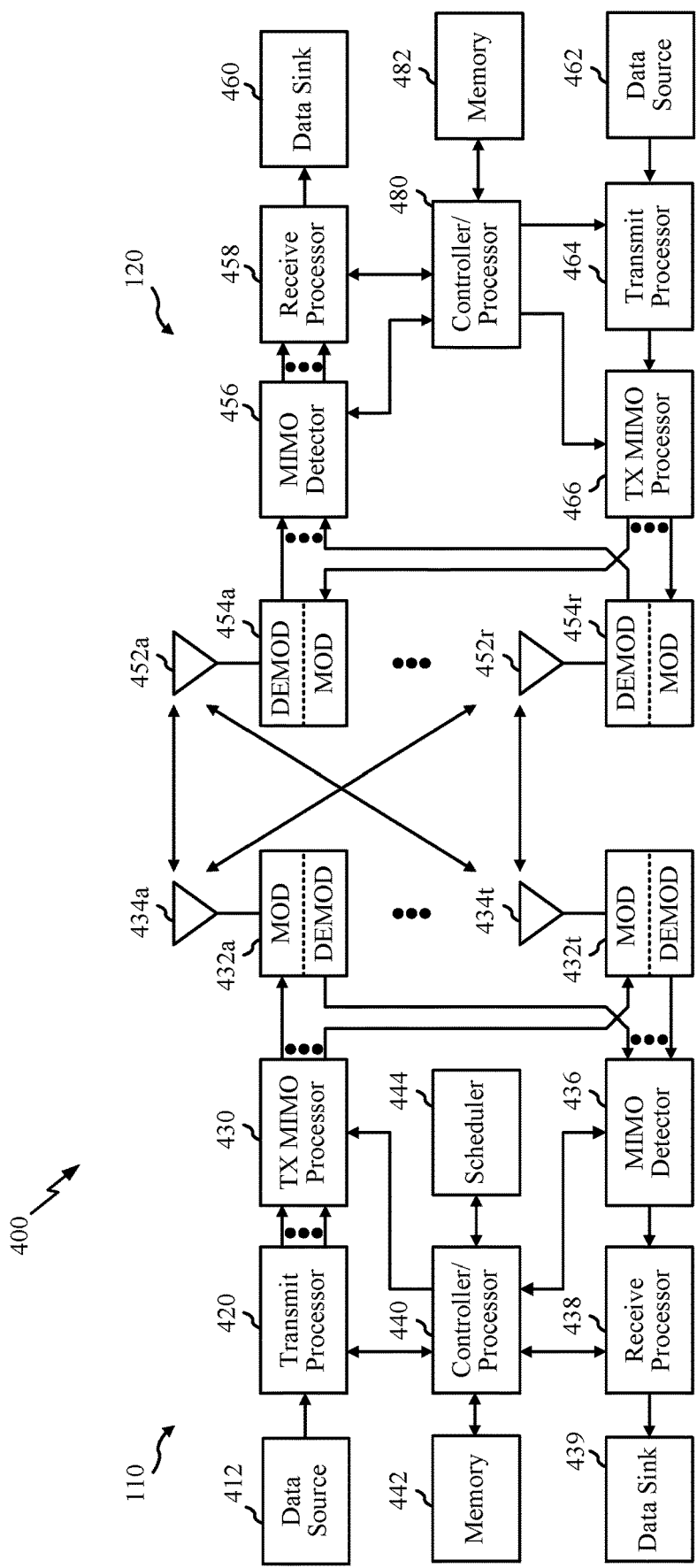
FIG. 4 is a block diagram conceptually illustrating a design of an example Node B and user equipment (UE), according to aspects of the present disclosure.

FIG. 4 illustrates a block diagram 400 including example components of the base station 110 and UE 120 illustrated in FIG. 1, which may be used to implement aspects of the present disclosure. One or more components of the BS 110 and UE 120 may be used to practice aspects of the present disclosure. For example, antennas 452, processors 466, 458, 464, memory 482 and/or controller/processor 480 of the UE 120 and/or antennas 434, processors 440, 420, 438, memory 442 and/or controller/processor 440 of the BS 110 may be used to perform the operations described herein and illustrated with reference to FIGS. 5-16. The BS 110 may comprise a TRP.

FIG. 4 shows a block diagram of a design of a base station/Node B/TRP 110 and a UE 120, which may be one of the base stations/Node Bs/TRPs and one of the UEs in FIG. 1. For a restricted association scenario, the base station 110 may be the macro Node B 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of various processes for the techniques described herein and those illustrated in the appended drawings. The processor 480 and/or other processors and modules at the UE 120 may also perform or direct, e.g., the execution of various processes for the techniques described herein and those illustrated in the appended drawings. A scheduler 444 may schedule UEs for data transmission on the downlink and/or uplink.

Example New Radio Cell Measurement

New radio (NR) may refer to radios configured to operate according to a wireless standard, such as 5G (e.g. wireless network 100). NR may include Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC).

NR cell may refer to a cell operating according in the NR network. A NR Node B (e.g., Node B 110) may correspond to one or multiple transmission reception points (TRPs). As used herein, a cell may refer to a combination of downlink (and potentially also uplink) resources. The linking between the carrier frequency of the downlink resources and the carrier frequency of the uplink resources is indicated in the system information (SI) transmitted on the downlink resources. For example, system information can be transmitted in a physical broadcast channel (PBCH) carrying a master information block (MIB).

NR RAN architecture may include a central unit (CU) (e.g., network controller 130). The CU may be an Access node controller (ANC). The CU terminates backhaul interface to RAN-CN, terminates backhaul interface to neighbor RAN node. The RAN may include a distributed unit that may be one or more TRPs that may be connected to one or more ANCs (not shown). TRPs may advertise System Information (e.g., Global TRP ID), may include PDCP/RLC/MAC functions, may comprise one or more antenna ports, may be configured to individually (dynamic selection) or jointly (joint transmission), and may serve traffic to the UE.

Example New Design for an Uplink Control Channel 5G wireless standard allows usage of a new uplink frame/subframe structure. This new uplink frame/subframe structure may allow single symbol PUCCH as well as multiple symbol PUCCH. Thus, there is a need for new PUCCH design to accommodate single symbol and multiple symbol PUCCH for use in 5G systems.

Aspects of the present disclosure discuss several new patterns for transmitting PUCCH on the uplink in one or more symbols of a frame/subframe. While certain aspects of the present disclosure may be discussed with respect to one or more symbols, they are equally applicable to portions of symbols (e.g., split-symbols).

FIG. 5 illustrates example operations 500 performed by a UE for transmitting PUCCH, in certain aspects of the present disclosure. Operations 500 begin, at 502, by determining, based on a tone mapping pattern (e.g., PUCCH resource mapping pattern including time and frequency resources for transmitting the PUCCH) from a plurality of tone mapping patterns for an uplink control channel (e.g., PUCCH), resources for transmitting the uplink control channel. At 504, the UE transmits the uplink control channel using the determined resources.

Figure 6:
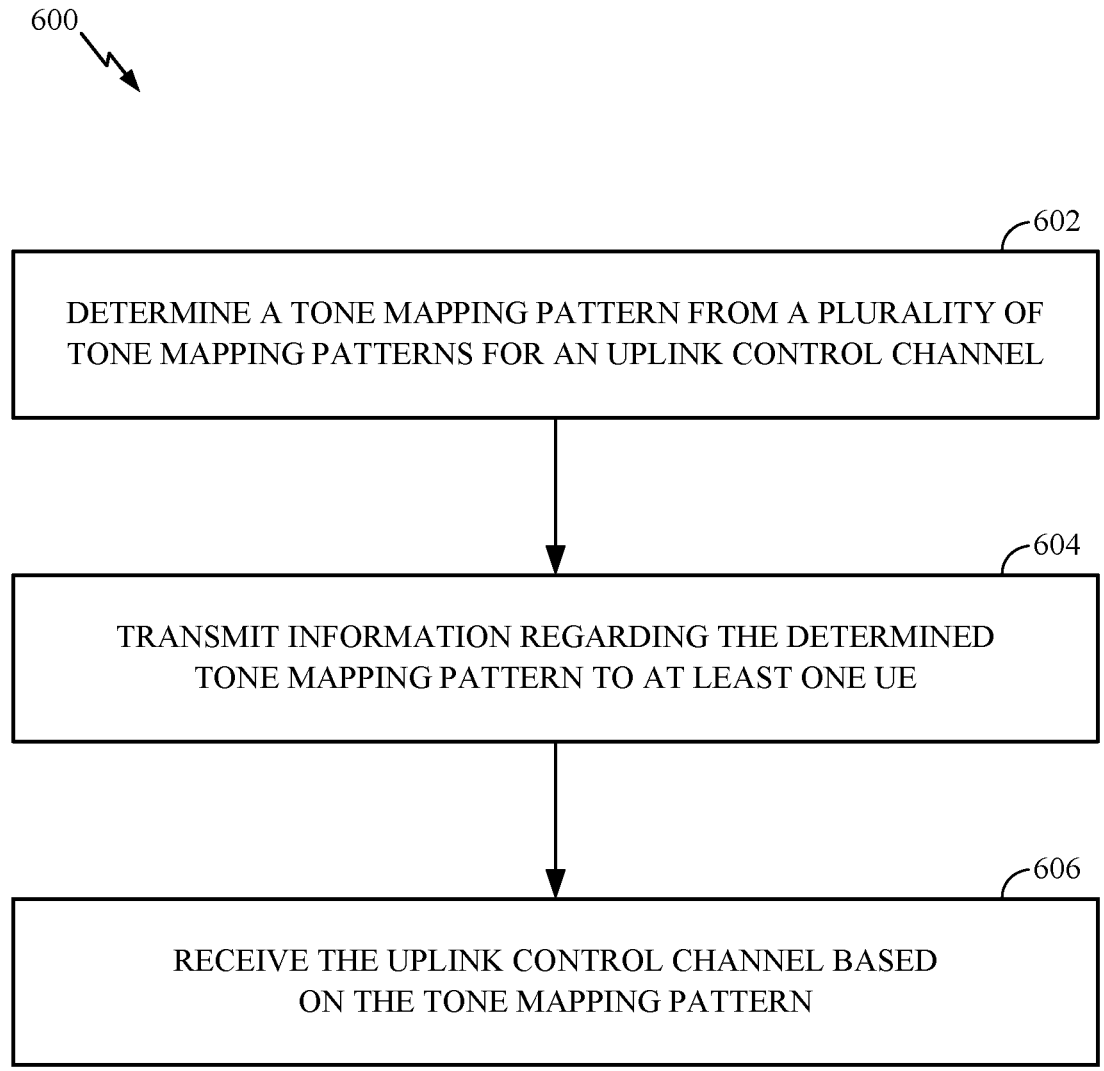
FIG. 6 illustrates example operations performed by a Base Station (BS) for scheduling and receiving PUCCH, in certain aspects of the present disclosure.

FIG. 6 illustrates example operations 600 performed by a Base Station (BS) for scheduling and receiving PUCCH, in certain aspects of the present disclosure. Operations 600 begin, at 602, by determining a tone mapping pattern from a plurality of tone mapping patterns for an uplink control channel. At 604, the BS transmits information regarding the determined tone mapping pattern to at least one UE. At 606, the BS receives the uplink control channel based on the tone mapping pattern.

In certain aspects, PUCCH may be scheduled and transmitted in a single symbol or a portion of a single symbol (e.g., split-symbol), or multiple symbols or portions of multiple symbols (e.g., multiple split-symbols). Thus, in certain aspects, the PUCCH tone mapping patterns in accordance with aspects of the present disclosure may include PUCCH scheduled in a single symbol, portion of a symbol, or in multiple symbols including portions of one or more symbols. In certain aspects, one or more PUCCH channels may be transmitted using each of the PUCCH patterns discussed herein.

Figure 7:
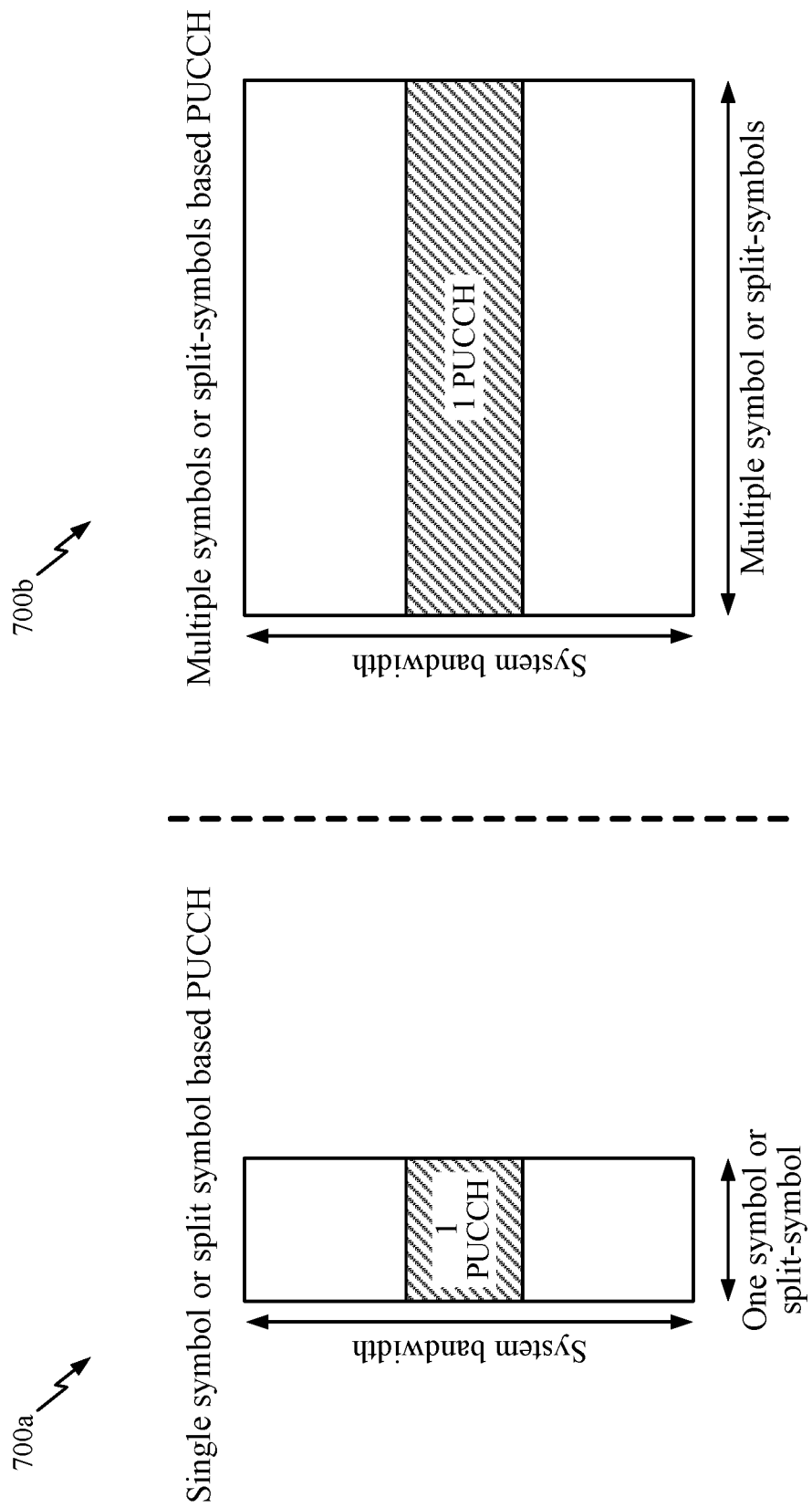
FIG. 7 illustrates PUCCH tone mapping patterns showing a single symbol or split-symbol PUCCH pattern and 700b showing a multiple symbol or split-symbols PUCCH pattern, in accordance with certain aspects of the present disclosure.

For example, FIG. 7 illustrates PUCCH tone mapping patterns 700a showing a single symbol or split-symbol PUCCH pattern and 700b showing a multiple symbol or split-symbols PUCCH pattern, in accordance with certain aspects of the present disclosure. As shown in FIG. 7, PUCCH pattern 700a includes PUCCH resources assigned over a single symbol or a portion of a single symbol in time domain, and PUCCH pattern 700b includes PUCCH resources assigned over multiple symbols or portions of multiple symbols in the time domain. In certain aspects, the multiple symbols or portions of symbols may be distributed in one subframe or in multiple contiguous or non-contiguous subframes.

In certain aspects, a PUCCH tone mapping pattern may include N tones in the frequency domain and one symbol or a portion of a symbol in the time domain. In certain aspects, the N tones may include one cluster of contiguous tones within one subband (e.g., subband or narrowband localized tone assignment). In certain aspects, the N tones may include one or more groups of multiple clusters of contiguous tones (e.g., distributed tone assignment), each cluster includes one or more of the N tones. In certain aspects, clusters of a group of clusters may be assigned within a subband (e.g., subband distributed tone assignment) or may be assigned such that they are spread over the entire system bandwidth or a wide bandwidth (e.g., wideband distributed tone assignment).

Figure 8:
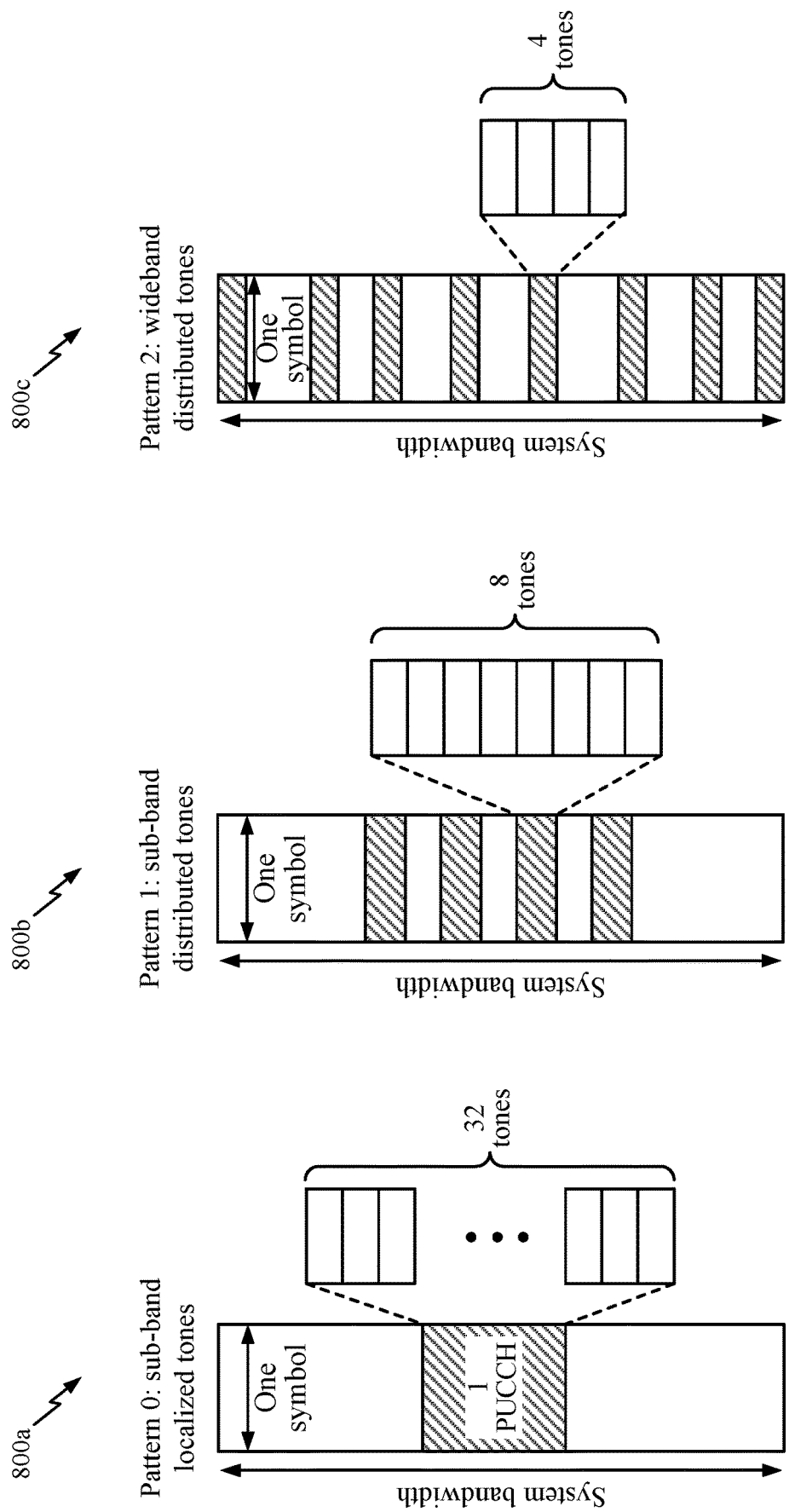
FIG. 8 illustrates single symbol PUCCH patterns, in accordance with certain aspects of the present disclosure.

FIG. 8 illustrates single symbol PUCCH patterns 800a-800c, in accordance with certain aspects of the present disclosure. PUCCH pattern 800a shows a subband localized tone assignment of N=32 tones. As shown in PUCCH pattern 800a, the 32 tones are assigned as one cluster of contiguous tones in one subband. PUCCH pattern 800b shows subband distributed tone assignment of the N=32 tones. As shown in PUCCH pattern 800b, the 32 tones are divided in to a group of multiple clusters, each cluster including 8 tones. The entire group of clusters is assigned within a subband. PUCCH pattern 800c shows a wideband distributed tone assignment of the N=32 tones. As shown in PUCCH pattern 800c, the 32 tones are divided into a group of multiple clusters, each cluster including 4 tones. The clusters of the group are distributed over the entire system bandwidth. In an aspect, the clusters of the group may be distributed over less than the entire system bandwidth that is wider than a subband.

In certain aspects, a PUCCH tone mapping pattern may include N tones in the frequency domain and multiple symbols, portions of multiple symbols, or a combination thereof, in the time domain. In certain aspects, each of the multiple symbols or portions of symbols may include one cluster of contiguous tones (e.g., one cluster of N tones) assigned within one subband (e.g., subband localized tones). In an aspect, the cluster of contiguous tones hops between subbands across symbols or portions of symbols.

In certain aspects, each of the multiple symbols or portions of symbols may include a group of multiple clusters of contiguous tones (e.g., distributed assignment), each cluster including one or more of the N tones. In certain aspects, clusters of a group of clusters in a particular symbol may be assigned within a subband (e.g., subband distributed assignment). In an aspect, a group of clusters hops between subbands across the symbols or portions of symbols.

In certain aspects, clusters of a group of clusters in a particular symbol may be assigned such that the clusters are spread over the entire system bandwidth or a wide bandwidth (e.g., wideband distributed assignment). In an aspect, each cluster of a group of clusters hops frequencies across symbols or portions of symbols.

In an aspect, the N tones are divided equally between clusters of a group of clusters.

It may be noted that while the following examples of multi-symbol PUCCH patterns include two symbols for ease of explanation, each of the multi-symbol patterns may include two or more symbols.

Figure 9:
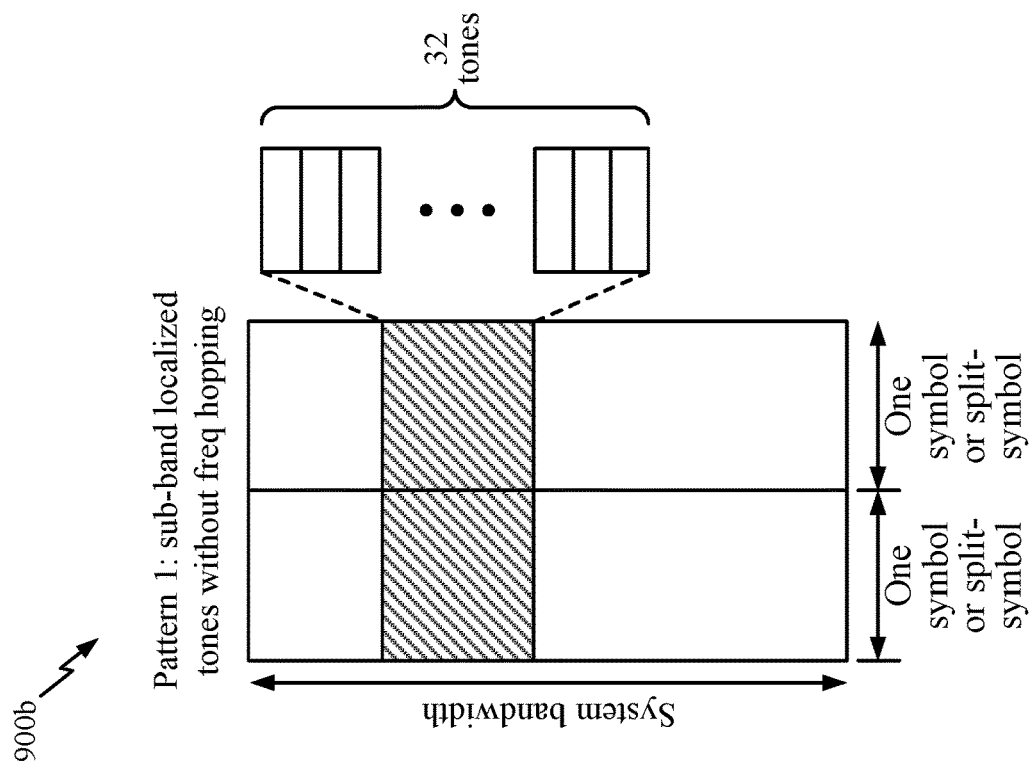
FIG. 9 illustrates multi-symbol PUCCH patterns with subband localized tone assignment, in accordance with certain aspects of the present disclosure.
Figure 9:
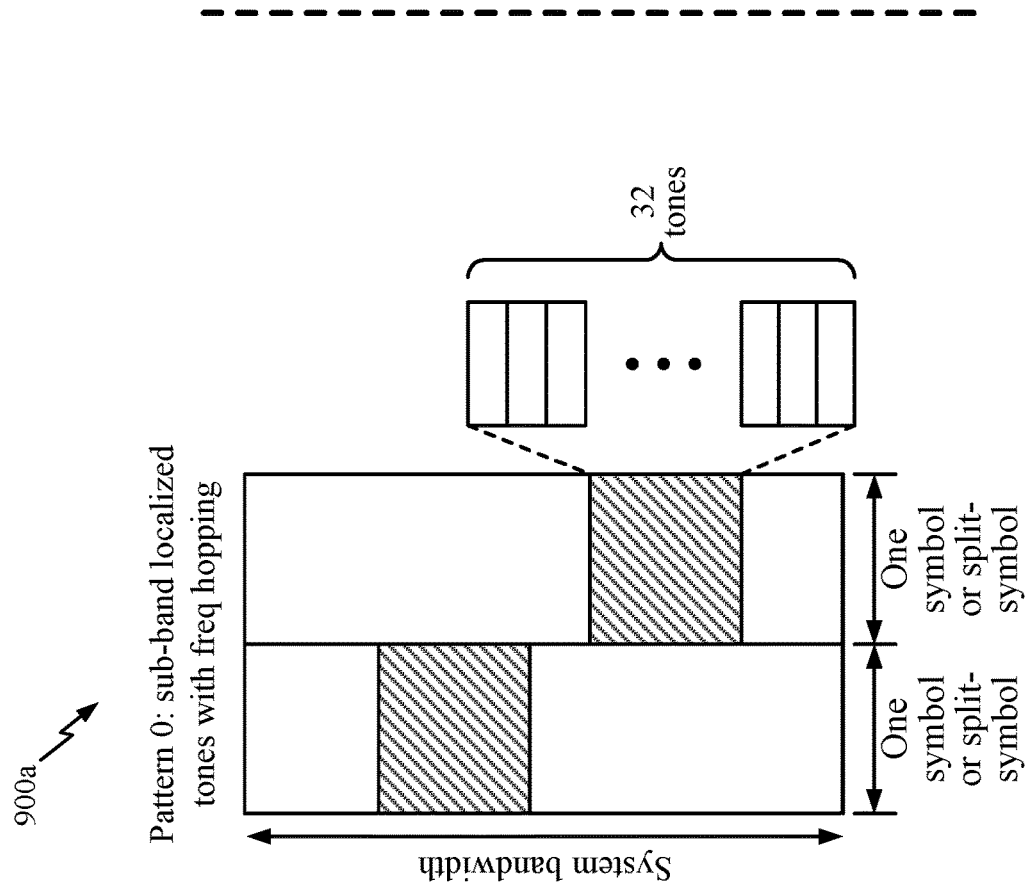

FIG. 9 illustrates multi-symbol PUCCH patterns 900a and 900b with subband localized tone assignment, in accordance with certain aspects of the present disclosure. PUCCH pattern 900a shows an example subband localized tone assignment with frequency hopping. As shown, the PUCCH pattern 900a includes N=32 tones assigned over two symbols. Each of the two symbols includes a cluster of 32 contiguous tones assigned in a localized manner in one subband. Additionally, as shown, the cluster hops from a first subband in the first symbol to a second subband in the second symbol.

PUCCH pattern 900b shows an example subband localized tone assignment with no frequency hopping. Similar to the PUCCH pattern 900a, PUCCH pattern 900b includes N=32 tones assigned over two symbols with each of the two symbols including a cluster of 32 tones assigned in a localized manner in one subband. However, the cluster does not hop subbands between the symbols. As shown, in both symbols the clusters occupy the same subband.

Figure 10:
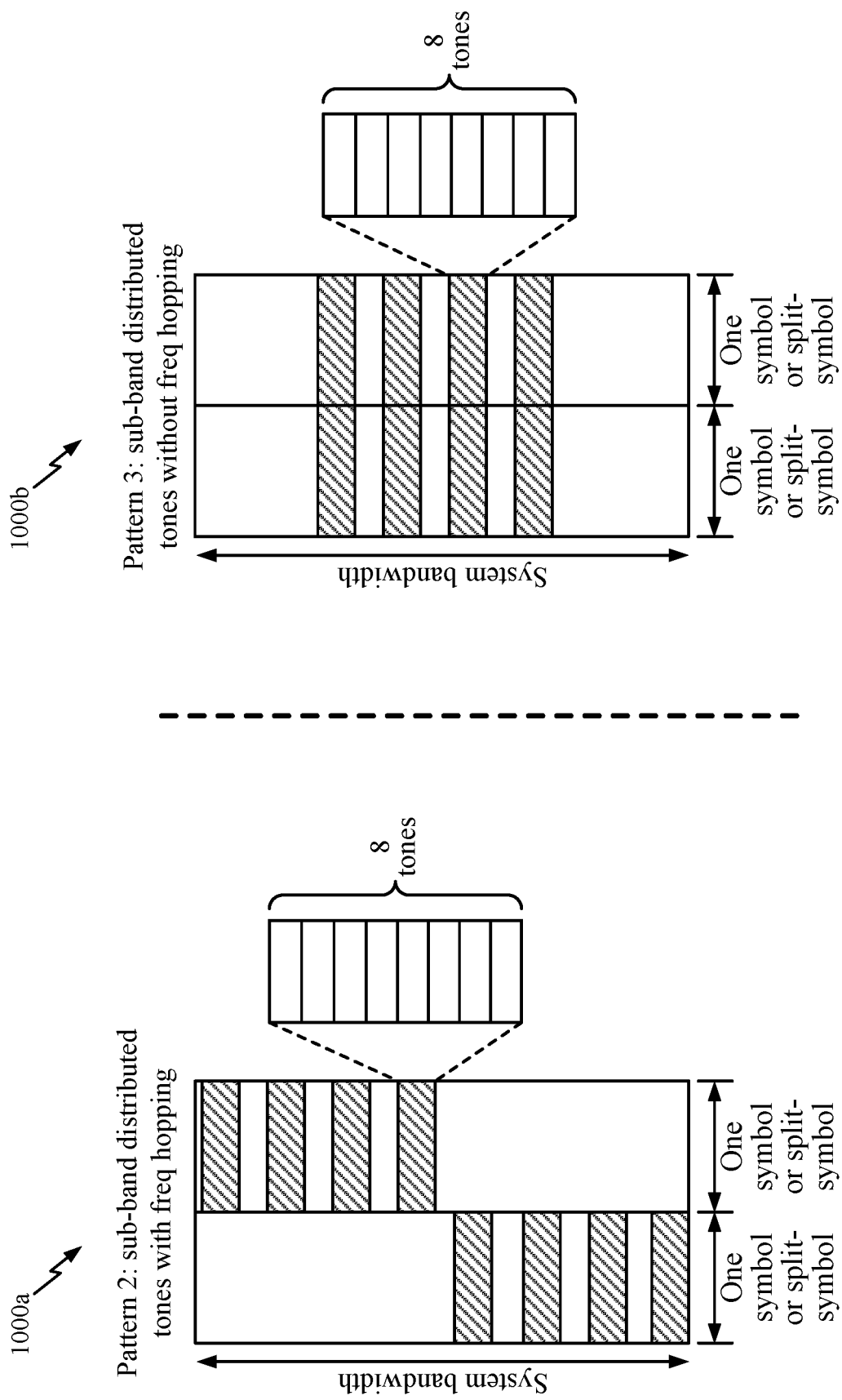
FIG. 10 illustrates multi-symbol PUCCH patterns with subband distributed tone assignment, in accordance with certain aspects of the present disclosure.

FIG. 10 illustrates multi-symbol PUCCH patterns 1000a and 1000b with subband distributed tone assignment, in accordance with certain aspects of the present disclosure. PUCCH pattern 1000a shows an example subband distributed tone assignment with frequency hopping. As shown, PUCCH pattern 1000a shows N=32 tones assigned over two symbols. Each of the two symbols includes one group of multiple clusters of contiguous tones, each cluster including 8 tones. Further, the clusters of each group of clusters is assigned within one subband. Additionally, as shown, the group of clusters hops from a first subband in the first symbol to a second subband in the second symbol.

PUCCH pattern 1000b shows an example subband distributed tone assignment with no frequency hopping. Similar to the PUCCH pattern 1000a, PUCCH pattern 1000b includes N=32 tones assigned over two symbols, each of the two symbols including one group of multiple clusters of contiguous tones, and the clusters of each group of clusters is assigned within one subband. However, unlike the PUCCH pattern 1000a, the groups of clusters do not hop subbands between the two symbols. As shown, in both the symbols, the groups of clusters occupy the same subband.

Figure 11:
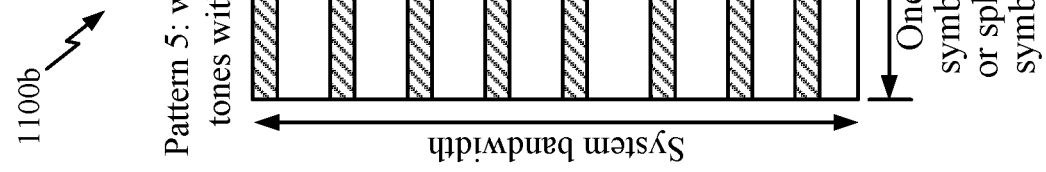
FIG. 11 illustrates multi-symbol PUCCH patterns with wideband distributed tone assignment, in accordance with certain aspects of the present disclosure.
Figure 11:
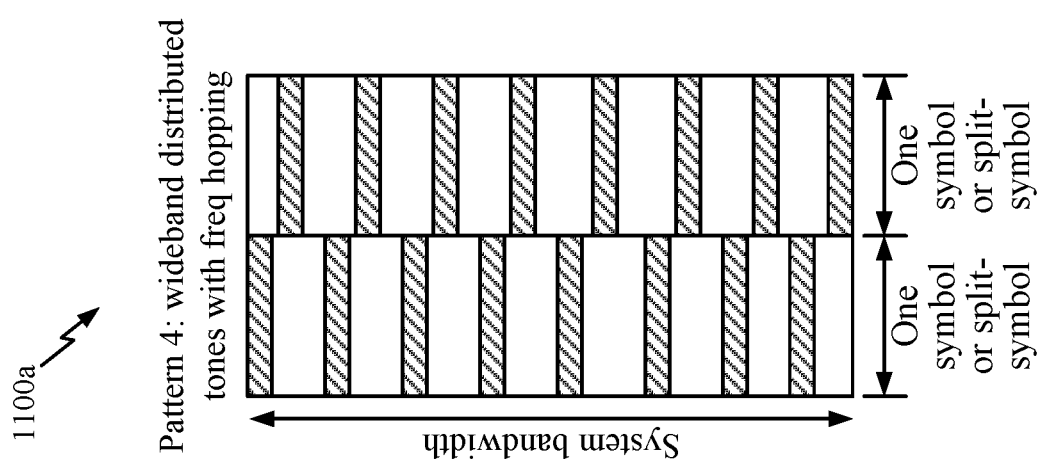

FIG. 11 illustrates multi-symbol PUCCH patterns 1100a and 1100b with wideband distributed tone assignment, in accordance with certain aspects of the present disclosure. PUCCH pattern 1100a shows an example wideband distributed tone assignment with frequency hopping. As shown, PUCCH pattern 1100a shows N tones (e.g., N=32 tones) assigned over two symbols. Each of the two symbols includes one group of multiple clusters of contiguous tones, each cluster including one or more of the N tones. Further, as shown, the clusters of each group are assigned over the entire system bandwidth. Additionally, as shown, each cluster hops frequencies across the two symbols.

PUCCH pattern 1100b shows an example wideband distributed tone assignment with no frequency hopping across the symbols. Similar to the PUCCH pattern 1100a, PUCCH pattern 1100b includes N tones (e.g., N=32 tones) assigned over two symbols, each of the two symbols including one group of multiple clusters of contiguous tones. Further, the clusters of each group are assigned over the entire system bandwidth. However, unlike the PUCCH pattern 1100a, the clusters do not hop frequencies across the symbols. As shown, the clusters occupy the same tones in both the symbols.

In certain aspects, each of the single-symbol or multi-symbol PUCCH patterns discussed above may be further categorized based on different sub-patterns. For example, each single-symbol PUCCH tone mapping pattern may be further divided into sub-patterns based on different pilot densities and different pilot locations in frequency domain.

Figure 12:
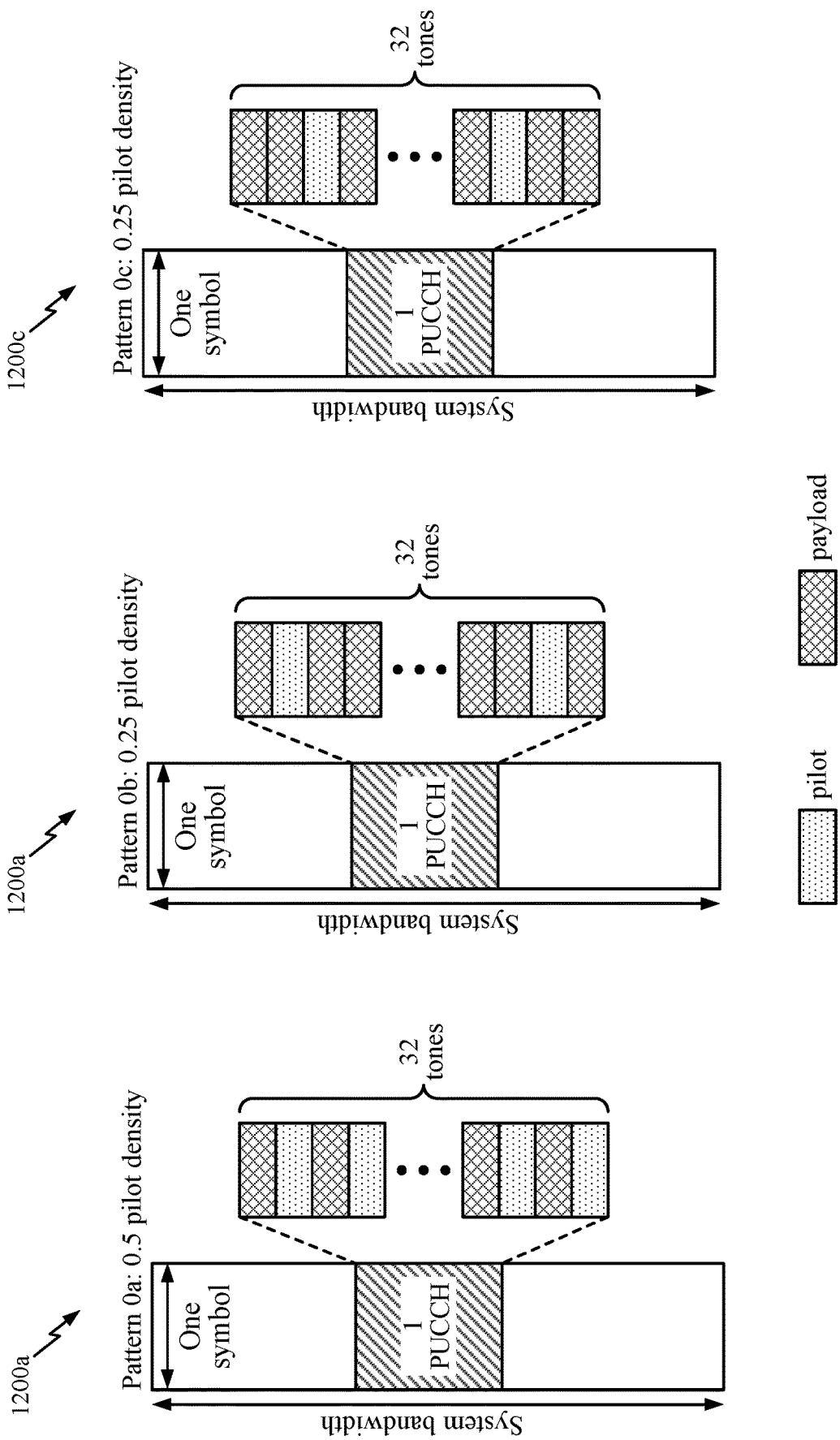
FIG. 12 illustrates sub-patterns for a subband localized PUCCH tone mapping pattern, in accordance with certain aspects of the present disclosure.

FIG. 12 illustrates sub-patterns 1200a-1200c for a subband localized PUCCH tone mapping pattern, in accordance with certain aspects of the present disclosure. Each of the PUCCH sub-patterns 1200a-1200c include a single cluster of contiguous N=32 tones assigned in a single subband. However, each of the sub-patterns 1200a-1200c differs from the other patterns in terms of the pilot density and/or pilot locations in the frequency domain assigned to the pattern. For example, as shown in FIG. 12, sub-pattern 1200a has a pilot density of 0.5 with half the tones assigned for pilot and the other half for data. Both sub-patterns 1200b and 1200c have a pilot density of 0.25 with one quarter of the tones assigned for pilot and the rest assigned to data. However, as shown, sub-patterns 1200b and 1200c differ in terms of the tones assigned to pilots (e.g., pilot location in frequency domain) in each of these sub-patterns.

In certain aspects, the multi-symbol PUCCH patterns allow more flexible sub-pattern design as compared to the single-symbol PUCCH patterns. For example, in addition to the different pilot density and different pilot locations in frequency domain, the multi-symbol PUCCH sub-patterns may have different pilot locations in time domain as well.

Figure 13:
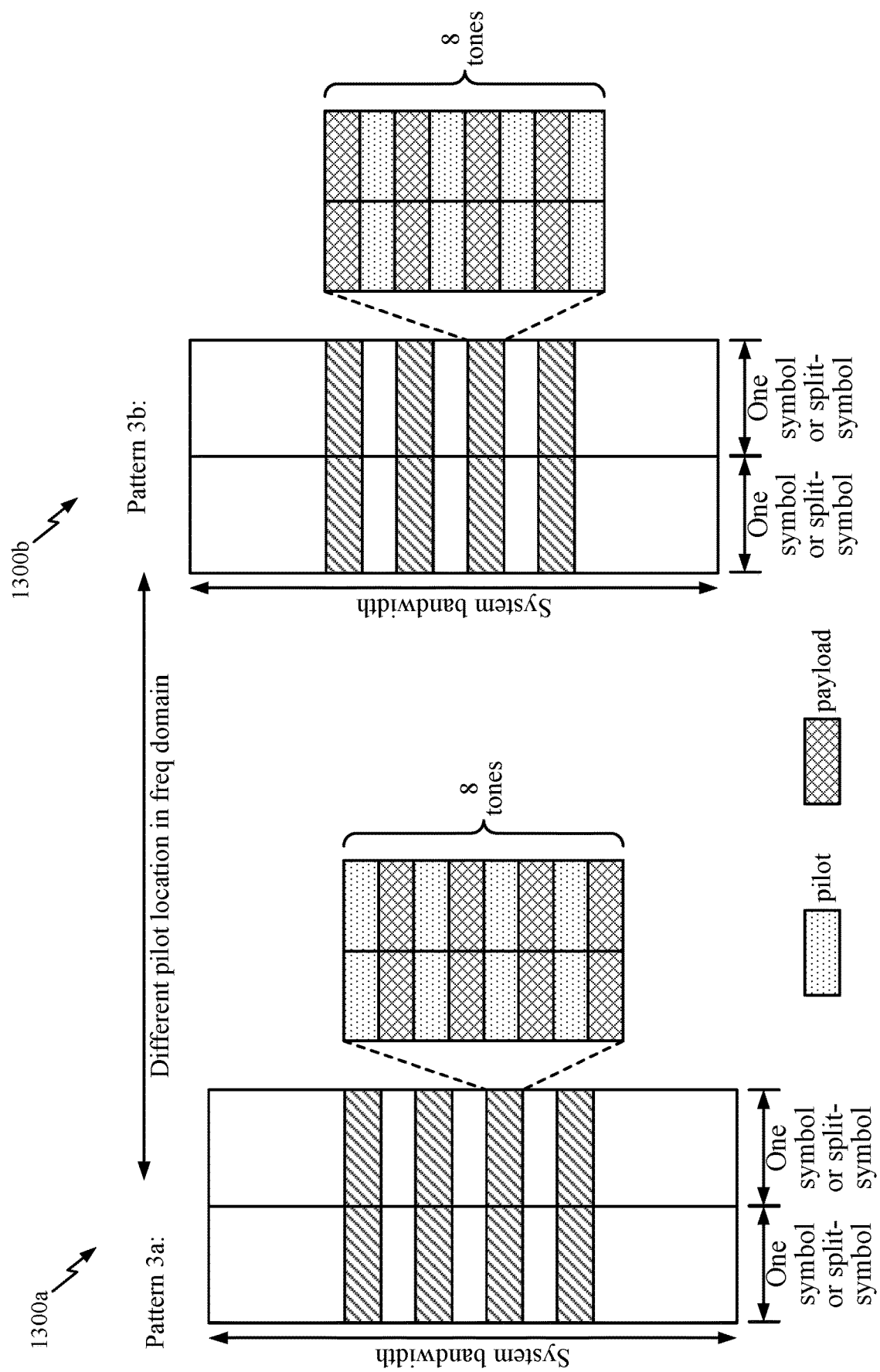
FIG. 13 illustrates example sub-patterns for a subband distributed PUCCH tone mapping pattern, in accordance with certain aspects of the present disclosure.

FIG. 13 illustrates example sub-patterns 1300a and 1300b for a subband distributed PUCCH tone mapping pattern, in accordance with certain aspects of the present disclosure. As shown in FIG. 13, each of the sub-patterns 1300a and 1300b includes N tones (e.g., N=32 tones) assigned as one group of multiple clusters of tones over two symbols, each cluster including 8 tones. Both sub-patterns 1300a and 1300b have a pilot density of 0.5 with half the tones assigned to pilot and the remaining half assigned to data. As shown, sub-patterns 1300a and 1300b have different tones assigned to pilot, i.e., different pilot locations in the frequency domain.

Figure 14:
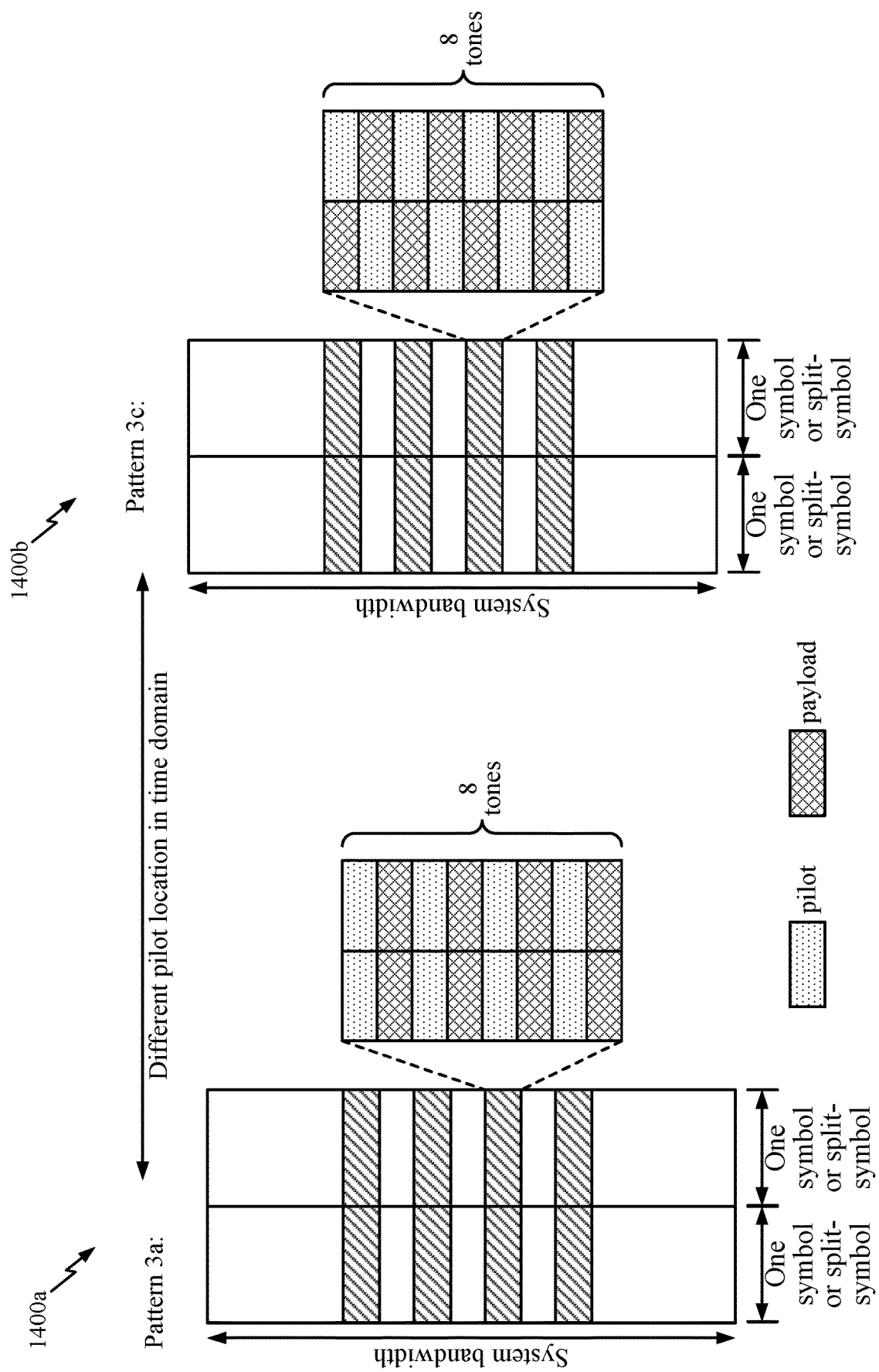
FIG. 14 illustrates example sub-patterns for a subband distributed PUCCH tone mapping pattern, in accordance with certain aspects of the present disclosure.

FIG. 14 illustrates example sub-patterns 1400a and 1400b for a subband distributed PUCCH tone mapping pattern, in accordance with certain aspects of the present disclosure. As shown in FIG. 14, each of the sub-patterns 1400a and 1400b includes N tones (e.g., N=32 tones) assigned as one group of multiple clusters of tones over tow symbols, each cluster including 8 tones. Both sub-patterns 1400a and 1400b have a pilot density of 0.5 with half of the tones assigned to pilot and the remaining half assigned to data. As shown, sub-patterns 1400a and 1400b have different pilot locations in time domain. For example, in sub-pattern 1400a, the same tones are assigned to pilots in both symbols. However, in sub-pattern 1400b, tones assigned to pilot in the first symbol differ from tones assigned to the pilot in the second symbol.

In certain aspect, although not shown in FIGS. 13 and 14, the sub-patterns corresponding to multi-symbol PUCCH patterns may also differ in pilot densities, in addition to pilot density in time and frequency domain. Further, while FIGS. 13 and 14 illustrates sub-patterns corresponding to multi-symbol subband distributed tone mapping patterns, these techniques equally apply to multi-symbol subband localized tone mapping patterns and multi-symbol wideband distributed tone mapping patterns.

In certain aspects, another sub-pattern corresponding to a multi-symbol tone mapping pattern includes assigning only pilot in one symbol and assigning only data to another symbol.

Figure 15:
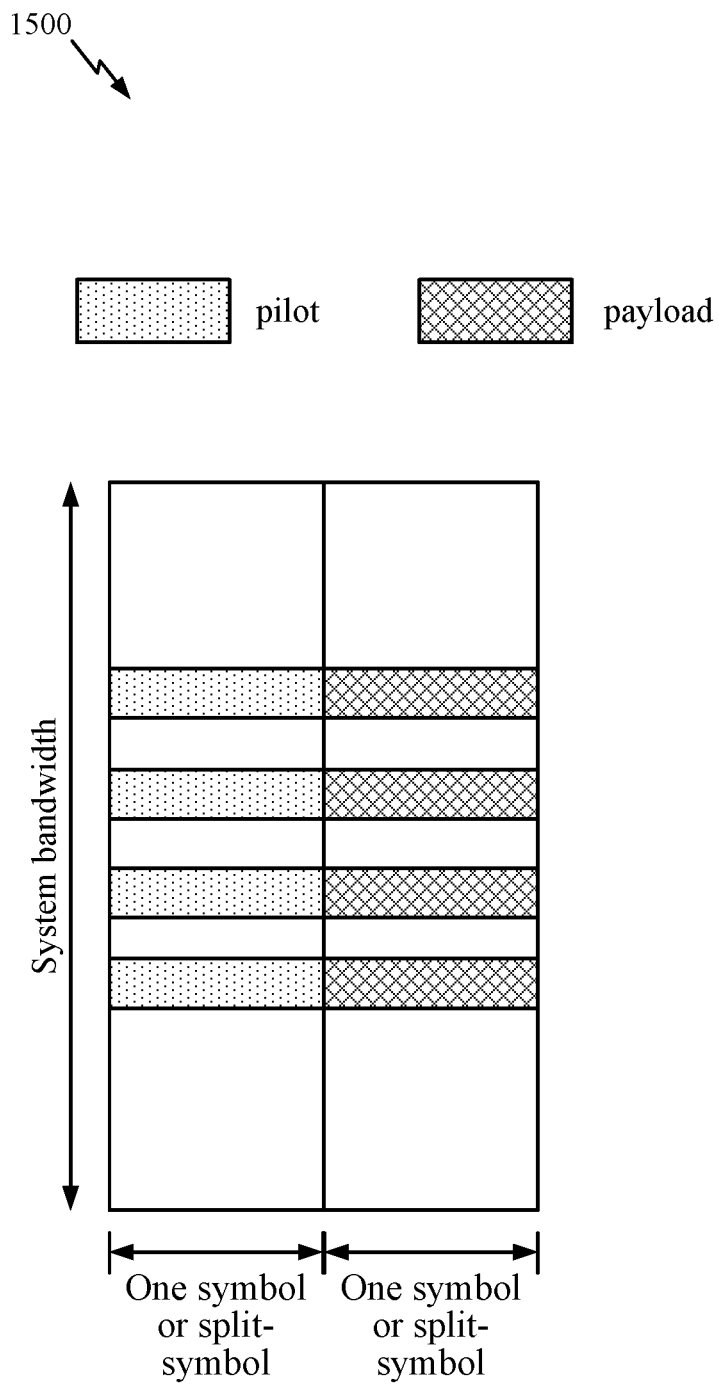
FIG. 15 illustrates an example sub-pattern corresponding to a subband distributed PUCCH tone mapping pattern, in accordance with certain aspects of the present disclosure.

FIG. 15 illustrates an example sub-pattern 1500 corresponding to a subband distributed PUCCH tone mapping pattern, in accordance with certain aspects of the present disclosure. As shown in FIG. 15, in sub-pattern 1500, the first symbol is assigned for transmitting pilots and the second symbol is assigned to carry payload.

In certain aspects, multiple PUCCH channels may be transmitted in each of the PUCCH patterns discussed above with each PUCCH channel carrying uplink control signals corresponding to multiple UEs. In certain aspects, the two or more different PUCCH channels may be frequency division multiplexed (FDM) within and symbol and each PUCCH channel may code division multiplex (CDM) control signals corresponding to multiple UEs.

Figure 16:
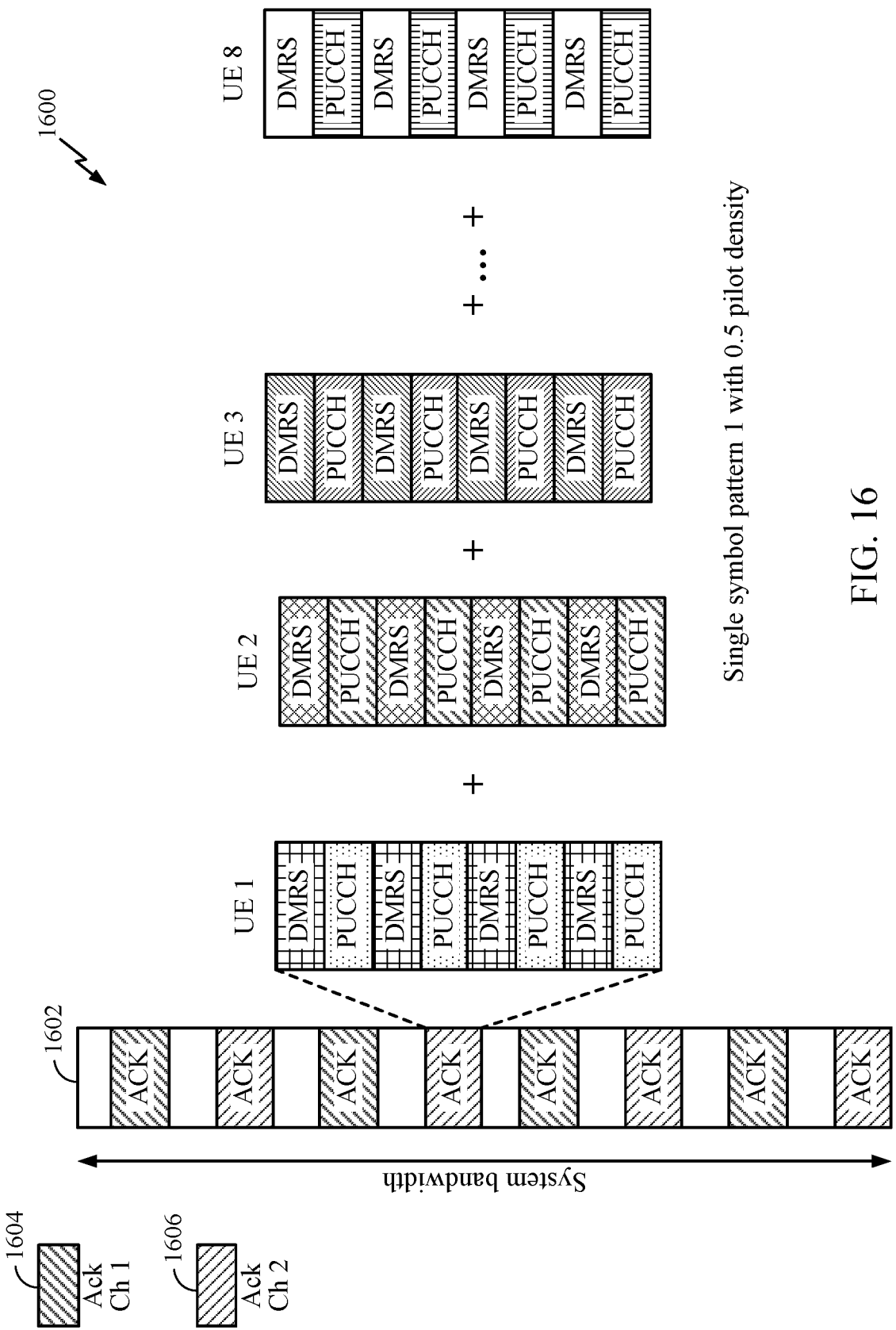
FIG. 16 illustrates an example PUCCH pattern multiplexing multiple PUCCH channels and UEs, in accordance with certain aspects of the present disclosure.

FIG. 16 illustrates an example PUCCH pattern 1600 multiplexing multiple PUCCH channels and UEs, in accordance with certain aspects of the present disclosure. As shown in FIG. 16, symbol 1602 frequency division multiplexes two PUCCH channels 1604 and 1606. Further, PUCCH channel 1606 code division multiplexes control signals corresponding to UEs 1-8.

In certain aspects, a NodeB (e.g., serving NodeB) may signal information regarding a tone mapping pattern to be used by a UE (e.g., served UE), for example, via semi-static RRC signaling. For example, the information may include one or more of the number of tones (e.g., N tones) and the particular pattern including single symbol or multi-symbol subband localized pattern, subband distributed pattern or wideband distributed pattern. The information may also include information regarding the hopping pattern between symbols.

In certain aspects, the NodeB further signals information regard sub-patterns to the UE via at least one of RRC signaling or PDCCH dynamic signaling. The information regarding sub-patterns may include at least one of the pilot density, pilot locations in time domain, or pilot locations in frequency domain.

In certain aspects, the number of tones N, the PUCCH pattern and the pilot sub-pattern may be different for different UEs. In an aspect, the number of tones N, the PUCCH pattern and the pilot sub-pattern are determined at the NodeB based on UL reference signals, e.g., Sounding Reference Signal (SRS).

In certain aspects, for single symbol or multi-symbol subband based PUCCH patterns, the NodeB may dynamically select and schedule one or more of the best available subbands based on channel conditions (e.g., UL channel estimates based on SRS received from the UE) to benefit from subband scheduling gain. In an aspect, the dynamic scheduling decision is signaled to the UE via DL PDCCH. In certain aspects, the Node B transmits to the UE a time period for which a particular assigned subband is to be used. In an aspect, in the absence of a particular time period defined for usage of a subband, the UE continues to use the subband until new signaling (e.g., new subband assignment) is received.

In certain aspects, the UE may implicitly determine one or more subbands to be used based on resources assigned to at least one of a downlink control channel (e.g., PDCCH) or downlink data channel (e.g., PDSCH). For example, the UE may derive a subband based on the first PDCCH CCE location or PDSCH RB location.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product/computer readable medium for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
   determining a tone mapping pattern having resources assigned for transmitting an uplink control channel, wherein the tone mapping pattern assigns a plurality of tones in a frequency domain and no more than a single symbol or no more than a portion of the single symbol in a time domain; and
   transmitting the uplink control channel using the assigned resources of the tone mapping pattern.

2. The method of claim 1, wherein, in the tone mapping pattern, at least one of a density of a pilot, a location of the pilot in the frequency domain, or a location of the pilot in the time domain is different from another tone mapping pattern.

3. The method of claim 2, wherein information regarding at least one of the density of the pilot, the location of the pilot in the frequency domain, and the density of the pilot in the time domain is received via at least one of semi-static Radio Resource Control (RRC) signaling or Physical Downlink Control Channel (PDCCH) dynamic signaling.

4. The method of claim 1, wherein the plurality of tones include one cluster of contiguous tones within a subband.

5. The method of claim 4, wherein the cluster hops between subbands across the single symbol or the portion of the single symbol and another symbol or a portion of the other symbol in the time domain.

6. The method of claim 5, further comprising:
   transmitting a Sounding Reference Signal (SRS) for determination of channel conditions between the UE and a serving base station; and
   receiving information regarding at least one of the subbands, wherein the at least one subband was selected based on the channel conditions between the UE and the serving base station,
   wherein the information is received in at least one of a downlink control channel or via semi-static Radio Resource Control (RRC) signaling, wherein the information includes information regarding a time period for which the UE is to use the at least one subband.

7. The method of claim 5, further comprising:
   determining at least one of the subbands based on resources assigned to at least one of a downlink control channel or a downlink data channel.

8. The method of claim 1, wherein the plurality of tones includes at least one group of multiple clusters of contiguous tones, each cluster including one or more of the plurality of tones.

9. The method of claim 8, wherein the at least one group of multiple clusters of contiguous tones is assigned within a subband.

10. The method of claim 8, wherein the clusters of the at least one group of multiple clusters of contiguous tones are spread over a system bandwidth.

11. The method of claim 10, wherein each cluster of the group of clusters hops frequencies across the single symbol or the portion of the single symbol and another symbol or a portion of the other symbol in the time domain.

12. The method of claim 1, wherein the tone mapping pattern comprises the uplink control channel frequency division multiplexed with at least one other uplink control channel.

13. The method of claim 12, wherein the tone mapping pattern comprises the control channel resources for the UE code division multiplexed with control channel resources for at least one other UE.

14. A method for wireless communication by a Base Station (BS), comprising:
   determining a tone mapping pattern having resources assigned for an uplink control channel, wherein the tone mapping pattern assigns a plurality of tones in a frequency domain and no more than a single symbol or no more than a portion of the single symbol in a time domain;
   transmitting information regarding the determined tone mapping pattern to at least one UE; and
   receiving the uplink control channel based on the tone mapping pattern.

15. The method of claim 14, wherein, in the tone mapping pattern, at least one of a density of a pilot, a location of the pilot in the frequency domain, or a location of the pilot in the time domain is different from another tone mapping pattern.

16. The method of claim 15, wherein transmitting the information comprises transmitting information regarding at least one of the density of the pilot, the location of the pilot in the frequency domain, and the density of the pilot in the time domain via at least one of semi-static Radio Resource Control (RRC) signaling or Physical Downlink Control Channel (PDCCH) dynamic signaling.

17. The method of claim 14, wherein the plurality of tones include one cluster of contiguous tones within a subband.

18. The method of claim 17, wherein the cluster hops between subbands across the single symbol or the portion of the single symbol and another symbol or a portion of the other symbol in the time domain.

19. The method of claim 18, further comprising:
   receiving a Sounding Reference Signal (SRS) from the at least one UE;
   determining channel conditions between the B S and the at least one UE based on the received SRS;
   selecting at least one of the subbands based on the determined channel conditions; and
   transmitting information regarding the at least one subband to the at least one UE,
   wherein the information is transmitted in at least one of a downlink control channel or via semi-static Radio Resource Control (RRC) signaling, wherein the information includes information regarding a time period for which the at least one UE is to use the at least one subband.

20. The method of claim 14, wherein the plurality of tones include at least one group of multiple clusters of contiguous tones, each cluster including one or more of the plurality of tones.

21. The method of claim 20, wherein the at least one group of multiple clusters is assigned within a subband.

22. The method of claim 20, wherein the at least one clusters of the group of multiple clusters are spread over a system bandwidth.

23. The method of claim 22, wherein each cluster of the group of clusters hops frequencies across the single symbol or the portion of the single symbol and another symbol or a portion of the other symbol in the time domain.

24. The method of claim 14, wherein transmitting the information regarding the tone mapping pattern comprises transmitting the information via semi-static Radio Resource Control (RRC) signaling.

25. The method of claim 14, wherein the tone mapping pattern comprises the uplink control channel frequency division multiplexed with at least one other uplink control channel.

26. The method of claim 25, wherein the tone mapping pattern comprises control channel resources for the at least one UE code division multiplexed with control channel resources for at least one other UE.

27. An apparatus for wireless communication by a user equipment (UE), comprising:
   means for determining a tone mapping pattern having resources assigned for transmitting an uplink control channel, wherein the tone mapping pattern assigns a plurality of tones in a frequency domain and no more than a single symbol or no more than a portion of the single symbol in a time domain; and
   means for transmitting the uplink control channel using the assigned resources of the tone mapping pattern.

28. An apparatus for wireless communication by a Base Station (BS), comprising:
   means for determining a tone mapping pattern having resources assigned for an uplink control channel, wherein the tone mapping pattern assigns a plurality of tones in a frequency domain and no more than a single symbol or no more than a portion of the single symbol in a time domain;
   means for transmitting information regarding the determined tone mapping pattern to at least one UE; and
   means for receiving the uplink control channel based on the tone mapping pattern.

* * * * *